3,291,777
POLYMERS FROM POLYFLUOROKETONES
Gelu Stoeff Stamatoff, Newark, and Joseph William Wittmann, Wilmington, Del., assignors to E. I. du Pont de Nemours and Company, Wilmington, Del., a corporation of Delaware
No Drawing. Filed Feb. 27, 1963, Ser. No. 261,469
16 Claims. (Cl. 260—47)

This invention relates to high condensation polymers prepared from polyfluoroketones containing at least four fluorine atoms and aromatic compounds and their preparation.

In the past, various resins or polymers have been made which have high temperature stability. However, these resins suffer from the disadvantage either or having poor mechanical properties at elevated temperatures, or of being difficult to fabricate into useful objects.

It is an object of this invention to provide a polymer which has high thermal stability combined with good mechanical properties along with good retention of these properties at elevated temperatures. Another object is to provide such at resin which is readily fabricable. A further object is to provide a resin which has low flammability. A still further object is to provide a resin which has good outdoor durability.

These and other objects are accomplished by the present invention in which a polymeric resin is prepared having the structure $-(Ar-C(CX_3)_2)_n-$ wherein Ar is selected from the group consisting of unsubstituted aromatic radicals and aromatic radicals substituted with electron donating groups selected from the group consisting of alkyl and oxyalkyl groups containing from 1 to 10 carbon atoms and X is selected from the group consisting of fluorine, chlorine, and straight chain perhaloalkyl groups containing from 1 to 3 carbon atoms, wherein at least four of the X's are fluorine, and $n$ is an integer of greater than 10 and preferably greater than 20.

Examples of the aromatics that are suitable are the divalent radicals derived from benzene, biphenyl, terphenyl, diphenyl ether, naphthalene, anthracene, β-naphthyl ether, dibenzofuran, dibenzothiophene, thiophene, ferrocene, thianthrene, diphenyl sulfide, toluene, xylene, anisole. From this it may be seen that Ar is a divalent aromatic radical derived from any of; (1) unsubstituted monocyclic or polycyclic aromatic compounds such as benzene, biphenyl, terphenyl, naphthalene, anthracene and the like; (2) aromatic compounds substituted with "electron donor" groups such as alkyl, alkoxy, and thioalkoxy group including diphenyl ether, β-naphthyl ether, diphenyl sulfide, toluene, the xylenes, and anisole; (3) aromatic heterocyclic compounds such as thiophene, dibenzofuran, dibenzothiophene, thianthrene; and (4) aromatic organometallic compounds such as ferrocene.

Such polymers can be prepared by any of three methods. One of these is the condensation of an aromatic compound with a polyfluoroketone. Another method is by the self-condensation of one or more compounds of the structure $Ar-C(CX_3)_2Y$ wherein Ar— is the monovalent equivalent of —Ar—, and wherein Y is selected from the group consisting of OH, F, Cl, Br, $CF_3CO_2-$, $CH_3CO_2-$, and

Another method is by the condensation of a compound of the structure $Y(CX_3)_2C-Ar-C-(CX_3)_2Y$, wherein Y and Ar are as defined above with a second aromatic compound of the same class to make regular alternating copolymers, homopolymers or random copolymers. In each case the second aromatic compound is either an unsubstituted aromatic compound or one substituted with electron donating groups as defined above.

The polymerization reaction is carried out in a catalyst-solvent system. The catalysts are fluorides which are hydrolyzed by water to HF and an oxide. Examples of these systems comprise combinations of any of $BF_3$, $TiF_4$, $SF_4$, $SbF_3$, $SbF_5$, or $PF_5$ with HF or combinations of HF with organic solvents that do not undergo ready alkylation, such as o-dichlorobenzene, or tetrachloroethane, tetrachloroethylene, p-chlorotrifluoromethylbenzene, benzonitrile, trifluoromethylbenzene or any halogenated alkyl aromatic solvent. The hydrogen fluoride is preferably present in an amount of at least a mole equivalent to one of the monomers.

The polymerization reaction is preferably carried out at from 25° C. to 200° C. over a period of generally over 1 hour. This may be divided into two or more stages, such as by first heating at from 25° C. to 150° C. for about an hour and then heating at from 100° C. to 200° C. for about another hour. The polymerization is carried out in a pressure vessel with agitation. The pressure is not critical but has to be superatmospheric in order to get a practical amount of materials together. Such superatmospheric pressure is conveniently obtained by sealing the vessel after charging but prior to heating, thereby autogenously producing the pressure. It is preferred that the reaction be carried out in an inert atmosphere. Therefore, the reaction vessel is evacuated or flushed with nitrogen prior to charging with the reaction mixture.

*Example I*

Into an exacuated 110 cc. stainless steel shaker tube cooled to −80° C. were charged 10 g. of heptafluoroisopropylbenzene, 15 g. of boron trifluoride and 30 g. of anhydrous hydrogen fluoride. The tube was sealed and heated at 75° C. for two hours and at 150° C. for two hours and then cooled to room temperature. The volatile reaction products were vented from the tube and the viscous liquid product dissolved in methanol. Addition of a small amount of water resulted in precipitation of a light tan solid. This solid softened at about 100° C. and showed no functionality in its infrared spectrum. It is thus presumed to be a polymer of the following structure:

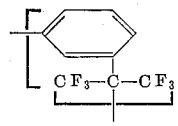

The polymer could be compression molded to a transparent, stiff, brittle film above its softening point.

*Example II*

A mixture of 41.5 g. (0.25 mole) of hexafluoroacetone, 42.5 g. (0.25 mole) of diphenyl ether and 2 g. of aluminum chloride was heated at 100° C. for eight hours in a 240 ml. "Hastelloy" bomb. The bomb was cooled and vented and the residue was distilled to give 37.5 g. of a viscous, colorless liquid, B.P. 103–109° C./0.5 mm., that solidified to a white solid on standing overnight. Recrystallization from pentane gave 29.1 g. of α,α-bis(trifluoromethyl) - 4 - phenoxybenzyl alcohol as colorless prisms, M.P. 53–54° C.

A clean, dry 180 cc. stainless steel shaker tube was charged under dry nitrogen with 10.0 g. of α,α-bis(trifluoromethyl) - p - phenoxybenzyl alcohol as prepared above and 3.0 g. of phosphorus pentoxide. The tube was closed, evacuated, flushed with nitrogen three times and finally evacuated at −80° C. There was then added 50.0 g. of hydrogen fluoride and 10.0 g. of boron trifluoride. The tube was sealed and heated at 100° C. for one hour and at 170° C. for seven hours. After cooling the reaction mixture, the hydrogen fluoride and boron trifluoride were removed under vacuum. The residual hydrogen fluoride was removed from the polymer by washing with a dilute solution of sodium carbonate. The polymer was cut into smaller pieces and allowed to soften in carbon tetrachloride. By refluxing the polymer for 30 minutes and osterizing it twice in carbon tetrachloride and once with benzene, granulated polymer was obtained. Further purification was achieved by repeating this procedure with methanol, acetone, ammonium hydroxide solution, or water. Isolated pure polymer corresponded to a 70% conversion. An infrared spectrum indicated the polymer to have substantially the structure:

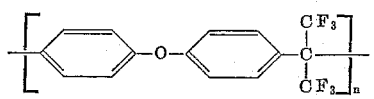

*Analysis.*—Calcd. for $(C_{15}H_8OF_6)$: C, 56.6; H, 2.5; F, 35.8. Found: C, 56.8; H, 3.0; F, 35.3.

The polymer could be compression molded at 330–350° C. to a transparent, stiff, tough film which exhibited the following mechanical properties: tensile strength, 8140 p.s.i.; ultimate strength, 7420 p.s.i.; yield stress, 8110 p.s.i.; ultimate elongation, 16%; yield elongation, 4.2%; flex. modulus at 25° C., 459,000 p.s.i.; at 50° C., 449,000 p.s.i.; at 100° C., 406,000 p.s.i.; at 150° C., 359,000 p.s.i.; Rockwell hardness, R scale, 122; L scale, 92; M scale, 16; tensile impact strength, 49 ft. lbs./in.$^3$; coefficient of thermal expansion, $5.0 \times 10^{-5}$ inches/inch/° C.; density, 1.46 g./cc.; dielectric constant, 2.68 at $10^3$ c.p.s.; dissipation factor, 0.0073 at $10^3$ c.p.s.; 0.0015 at $10^6$ c.p.s.; volume resistivity, $4.15 \times 10^{16}$ ohms/cm.; dielectric strength, 2019 volts/mil.

*Example III*

A clean, dry 320 cc. platinum tube was charged with 20 g. of α,α-bis(trifluoromethyl)-p-phenoxybenzyl alcohol prepared as in Example II, 100 g. of hydrogen fluoride and 14.5 g. of boron trifluoride. The tube was heated to 130° C. for 2 hours followed by 3 hours at 150° C. After venting of the excess hydrogen fluoride and boron trifluoride, the crude polymer was removed from the tube and dissolved in boiling carbon tetrachloride. The solution was filtered to remove inorganic matter and was then extracted with dilute ammonium hydroxide solution until the extracts were basic. The organic layer was then washed with water, dried and the polymer was precipitated by the addition of methanol. After drying in a vacuum oven at 100° C. there was obtained a 75% conversion of purified polymer. This polymer had an inherent viscosity (chlorobenzene) of (.35–.6) and could be compression molded at 225° C. to a stiff, tough sheet. An n-m-r-spectrum of the polymer dissolved in carbon tetrachloride was consistent with the structure indicated in Example II. Mechanical properties of the polymer are listed below.

| Temp., °C. | Ult. Strength, p.s.i. | Yield Stress | Flex. Mod., p.s.i. |
|---|---|---|---|
| 25 | 8,270 | 9,460 | 442,000 |
| 50 | 6,940 | 9,280 | 423,000 |
| 100 | 4,340 | 6,250 | 387,000 |
| 150 | 2,500 | 3,410 | 330,000 |

The polymer had a heat deflection temperature of 156° C., and a tensile impact strength of 99 ft. lbs./in.$^3$.

*Example IV*

A clean, dry 100 cc. stainless steel shaker tube was charged under nitrogen with 10.7 g. of α,α-bis(trifluoromethyl)-p-phenoxybenzyl chloride. The tube was closed, evacuated, flushed with nitrogen three times, finally evacuated, and cooled to −80° C. There was then added 50.0 g. of anhydrous hydrogen fluoride and 10.0 g. of boron trifluoride. The tube was sealed and heated at 100° C. one hour and at 150° C. for seven hours. After cooling the reaction mixture, the hydrogen fluoride and boron trifluoride were removed either by washing with a dilute solution of sodium carbonate or acetone. Further purification was achieved by the method of Example II. The pure, isolated polymer was obtained in 32% conversion. Its infrared spectrum indicated it to have the same structure as the polymer of Example II.

*Example V*

A clean and dry 180 cc. stainless steel shaker tube was charged under dry nitrogen with 16.5 g. of phenyl ether and 9.8 g. of phosphorus pentoxide. The tube was closed, evacuated, flushed with nitrogen 3 times and finally evacuated at −80° C. There was added 45.0 g. of hydrogen fluoride, 16.1 g. of hexafluoroacetone and 32.0 g. of boron trifluoride. The tube was sealed and heated at 100° C. for 4½ hours and at 140° C. for 7 hours. After cooling the reaction mixture, the hydrogen fluoride and boron trifluoride were removed under vacuum. The polymer was dissolved in carbon tetrachloride, neutralized with a dilute solution of sodium carbonate and washed two times with water. The carbon tetrachloride solution was concentrated and the polymer was reprecipitated by adding methanol. This procedure was repeated twice to give a 30% conversion of dry polymer, softening point 150–155° C. This polymer had an inherent viscosity of 0.057 in o-dichlorobenzene at 35° C. and pressed to a transparent, stiff, film. An infrared spectrum showed the polymer to have the same structure as that of Example II.

*Example VI*

A clean, dry 100 cc. stainless steel shaker tube was charged under dry nitrogen with 5.2 g. of 4,4′-bisperfluoroisopropylphenyl ether and 1.8 g. of phenyl ether. The tube was closed, evacuated, flushed with nitrogen 3 times and finally evacuated at −80° C. There was then added 35.6 g. of hydrogen fluoride and 7.1 g. of boron trifluoride. The tube was sealed and heated at 100° C. for 2 hours and at 150° C. for 7 hours. After cooling the reaction mixture, the hydrogen fluoride and boron trifluoride were removed under vacuum. Residual amounts of hydrogen fluoride were removed as described in Example II. The polymer was further purified as in Example II. Pure, isolated polymer was obtained in 58% conversion. It could be compression molded at 330–350° C. to a transparent, stiff film. The infrared spectrum of this film showed the polymer to be identical to that of Example II.

*Example VII*

A 100 cc. stainless steel shaker tube was charged with 2.94 g. of α,α-bis(trifluoromethyl)-p-phenoxybenzyl alcohol, 8.41 g. of α,α-bis(trifluoromethyl)-p-phenylbenzyl alcohol, 5 g. of o-dichlorobenzene, 15 g. of hydrogen fluoride and 7.1 g. of boron trifluoride. The reaction mixture was heated 2 hours at 130° C. followed by 4 hours at 160° C. The polymer was isolated and purified by the procedure of Example III.

There was obtained 7.39 g. (70% conversion) of polymer that softened at 265–290° C. and exhibited an inherent viscosity of 0.31 in carbon tetrachloride. The polymer was compression molded to a stiff, tough film at 325° C. Elemental analyses indicated a copolymer containing biphenyl and diphenyl ether units in the ratio of 3/1.

*Analysis.*—Calc.: C, 58.6; H, 2.6; F, 37.11. Found: C, 58.8; H, 2.8; F, 35.8.

An infrared spectrum was consistent with this structure.

*Example VIII*

A 320 cc. platinum tube was charged with 10.05 g. of 4,4′-bis(perfluoroisopropylphenyl)ether, 3.06 g. of biphenyl, 10.6 g. of boron trifluoride and 70 g. of hydrogen fluoride. The reaction mixture was heated 2 hours at 130° C. followed by 3 hours at 150° C. After isolation and purification by the method of Example III there was obtained 6.5 g. (51% conversion) of polymer that exhibited an inherent viscosity of 0.23 in chlorobenzene. The polymer softened at 230–240° C. and an infrared spectrum was consistent with the structure:

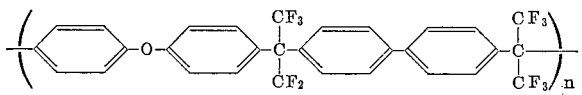

Compression molding at 275° C. gave a stiff, tough sheet.
*Analysis.*—Calc.: C, 58.1; H, 2.6; F, 36.8. Found C, 58.2; H, 2.9; F, 35.5.

Example IX

In a 320 cc. platinum tube were charged 10.46 g. of 4,4'-bis(perfluoroisopropylphenyl)ether, 3.47 g. of dibenzofuran, 10.5 g. of boron trifluoride and 70 g. of hydrogen fluoride. The reaction mixture was heated 2 hours at 110° C. followed by 3 hours at 140° C. After isolation and purification by the method of Example III, there was obtained 4.0 g. (32% conversion) of polymer that softened at 270–280° C. and exhibited an inherent viscosity of 0.24 in chlorobenzene. An infrared spectrum of the product was consistent with the structure:

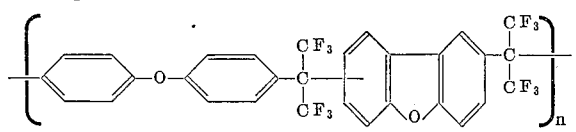

Compression molding at 300° C. yielded an extremely stiff sheet.

Example X

A 100 cc. stainless steel shaker tube was charged with 11.2 g. of α,α-bis(trifluoromethyl)-p-phenylbenzyl alcohol, 5 g. of o-dichlorobenzene, 15 g. of hydrogen fluoride, and 7.5 g. of boron trifluoride. The reaction mixture was heated 2 hours at 130° C. followed by 4 hours at 160° C. After venting of the excess hydrogen fluoride and boron trifluoride, the crude product was washed with methanol in an Osterizer and dried in a vacuum oven. It weighed 9 g. (80.5% conversion). 7 g. of this polymer was dissolved in hot carbon tetrachloride. The solution was extracted with 20% ammonium hydroxide until the washings were basic. The organic layer was washed well with water, dried, and the polymer was precipitated by the addition of methanol. After drying at 170° C. (at 50 mm. pressure) overnight there was obtained 5 g. of high molecular weight polymer that had an inherent viscosity of 0.4 in carbon tetrachloride solution. An infrared spectrum indicated the polymer to have been formed predominantly by p-substitution.
*Analysis.*—Calc.: C, 59.6; H, 2.7; F, 37.7. Found: C, 60.2; H, 2.8; F, 36.3.

The polymer could be compression molded at 335° C. to a stiff, tough film having a tensile strength at room temperature of 6,630 p.s.i. and a flex. modulus of 346,000 p.s.i. at room temperature. Flex. moduli determined at elevated temperature were:

| | ° C. |
|---|---|
| 328,000 | 75 |
| 245,000 | 175 |
| 192,000 | 255 |

Example XI

A 100 cc. copper lined shaker tube was charged with 8.8 g. of a mixture of α-naphthylbis(trifluoromethyl)carbinol and β-naphthylbis(trifluoromethyl)carbinol, 4 g. of boron trifluoride and 50 g. of hydrogen fluoride. The reaction mixture was heated 2 hours at 120° C. followed by 5 hours at 150° C. The crude product isolated by the method of Example X weighed 8.5 g. Purified high molecular weight polymer obtained by the procedure of Example III weighed 4.0 g. The polymer softened at 285–297° C., exhibited an inherent viscosity in carbon tetrachloride of 0.26 and could be compression molded at 280° C. to an extremely stiff film.

Example XII

α,α-Bis(chlorodifluoromethyl)-p-phenoxybenzyl alcohol (22 g., 0.06 mole) and sulfur tetrafluoride (16 g., 0.15 mole) were added to a 180 ml. stainless steel shaker tube and heated for five hours at 100° C. under autogenous pressure.

The solid removed from the tube formed a gel in acetone. The addition of methanol caused precipitation. The solid was removed by filtratioin, dried in a vacuum oven to give 12 gms. of white polymer (55% conversion) which softened at 180–185° C. The polymer could be compression molded at 150–175° C. to a stiff, transparent film. An infrared spectrum indicated para-substitution from the absorption pattern in the 5–6μ region. The polymer exhibited an inherent viscosity of 0.08 (CCl₄).

Similar results were obtained using sufur tetrafluoride/hydrogen fluoride as the catalyst system.

Example XIII

α,α-Bis(chlorodifluoromethyl)-p-phenoxybenzyl alcohol (11 g., 0.03 mole), boron trifluoride (10 g., 0.15 mole), hydrogen fluoride (5 g., 0.25 mole), and phosphorous pentoxide (3 g., 0.021 mole) were added to a 100 ml. stainless steel tube and heated for 7 hours at 125° C. under autogenous pressure.

The polymer removed from the tube was washed with methanol and dried. The dark, reddish-brown solid was insoluble in boiling carbon tetrachloride, weighed 9 gms. (82% conversion), and did not melt up to 300° C.

Example XIV

α,α-Bis(chlorodifluoromethyl)-p-phenoxybenzyl alcohol (11 g., 0.03 mole), boron trifluoride (10 g., 0.15 mole), hydrogen fluoride (20 g., 1.0 mole), and phosphorous pentoxide (3 g., 0.021 mole) were added to a 100 ml. stainless steel tube and heated for 7 hours at 100° C. under autogenous pressure. The polymer removed from the tube was washed with methanol, filtered, and dried to give 9.2 g. (84% conversion) of a very powdery tan solid. The solid was next extracted with boiling carbon tetrachloride (100 ml.) for 18 hours and filtered. The insoluble fraction was washed with methanol, filtered, and dried to give 4.3 gms. of tan solid. Pressing at 250° C./25,000 p.s.i. gave a transparent, stiff film. An infrared spectrum showed a different substitution pattern in the 5–6μ region than that of a para-substituted product. Chlorine and fluorine analyses showed the following:

Calculated: Cl, 20.20; F, 21.64. Found: Cl, 18.68, 18.71; F, 20.45, 20.51.

The low value of the chlorine content and the different substitution pattern in the infrared spectrum indicate some crosslinking through the CF₂–Cl group.

The addition of methanol to the carbon tetrachloride extraction filtrate caused the precipitation of a light tan solid (3.6 g.) which softened at 195–200° C. Pressing at 175° C./25,000 p.s.i. produced a transparent, stiff film. An infrared spectrum showed para-substitution from the absorption pattern in the 5–6μ region. The polymer exhibited an inherent viscosity of 0.14 (CCl₄).

Example XV

α,α-Bis(chlorodifluoromethyl)-4-phenoxybenzyl chloride (11 g., 0.029 mole), boron trifluoride (10 g., 0.15 mole) and hydrogen fluoride (20 g., 1.0 mole) were added to a 100 ml. stainless steel tube and heated for 7 hours at 100° C. under autogenous pressure.

The product was washed with methanol, filtered and dried. It was next extracted with 100 ml. of boiling carbon tetrachloride for 4 hours, filtered, and dried to give 7.7 gms. of brown polymer which showed no sign of melting up to 300° C.

The polymers of this invention are especially useful for forming films, sheets, wire jackets, and structural mem-

We claim:
1. A polymer having units of the structure

$$\text{-(Ar—C(CX}_3)_2\text{)}_n\text{-}$$

wherein Ar is selected from the group consisting of divalent unsubstituted aromatic radicals; divalent aromatic radicals substituted with electron donating groups, selected from the groups consisting of alkyl and oxyalkyl groups; divalent heterocyclic aromatic radicals; and ferrocene; and X is selected from the group consisting of chlorine, fluorine and straight chain perhaloalkyls of from 1 to 3 carbon atoms, wherein at least 4 of the X's are fluorine and $n$ is an integer greater than 10.

2. A polymer having the structure $$\text{-(Ar—(CF}_3)_2\text{)}_n\text{-}$$

wherein Ar is selected from the group consisting of divalent unsubstituted aromatic radicals; divalent aromatic radicals substituted with electron donating groups, selected from the groups consisting of alkyl and oxyalkyl groups; divalent heterocyclic aromatic radicals; and ferrocene, and $n$ is an integer greater than 10.

3. The polymer of claim 1 wherein Ar is phenylene.
4. The polymer of claim 2 wherein Ar is phenylene.
5. The polymer of claim 1 wherein Ar is diphenylene ether.
6. The polymer of claim 2 wherein Ar is diphenylene ether.
7. The polymer of claim 1 wherein Ar is biphenylene.
8. The polymer of claim 2 wherein Ar is biphenylene.
9. The polymer of claim 1 wherein —Ar— is randomly selected from biphenylene and diphenylene ether radicals.
10. The polymer of claim 1 wherein —Ar— is composed of regularly alternating biphenylene and diphenylene ether radicals.
11. The polymer of claim 2 wherein —Ar— is randomly selected from biphenylene and diphenylene ether radicals.
12. The polymer of claim 2 wherein —Ar— is composed of regularly alternating biphenylene and diphenylene ether radicals.
13. The polymer of claim 2 wherein —Ar— is composed of regularly alternating diphenylene ether and

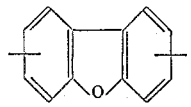

radicals.

14. A process comprising the steps of charging a vessel with substantially equimolar portions of a ketone of the structure $O\text{=}C(CX_3)_2$ wherein X is selected from the group consisting of chlorine, fluorine, and straight chain perhaloalkyls of from 1 to 3 carbon atoms, at least four of the X's being fluorine, and an aromatic compound selected from the group consisting of unsubstituted aromatic compounds; aromatic compounds substituted with electron donating groups, selected from the group consisting of alkyl and oxyalkyl groups; heterocyclic aromatic compounds; and ferrocene; a solvent comprising hydrogen fluoride, and a catalyst which is a fluoride hydrolyzed by water to hydrogen fluoride and an oxide, and heating said mixture at from 50 to 200° C. and recovering a condensation polymer.

15. A process comprising the steps of charging a vessel with a compound of the structure $\text{Ar—C(CX}_3)_2\text{Y}$ wherein Ar is selected from the group consisting of unsubstituted aromatic radicals; aromatic radicals substituted with electron donating groups, selected from the group consisting of alkyl and oxyalkyl groups; heterocyclic aromatic compounds; and ferrocene; X is selected from the group consisting of halogens and straight chain perhaloalkyls of from 1 to 3 carbon atoms, wherein at least 4 of the X's are fluorine, and wherein Y is selected from the group consisting of OH, F, Cl, Br, $CF_3CO_2$—, $CH_3CO_2$—, and

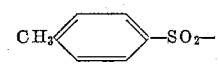

a solvent comprising hydrogen fluoride, and a catalyst which is a fluoride which is hydrolyzed by water to hydrogen fluoride and an oxide, and heating said reaction mixture at from 50 to 200° C. and recovering a condensation polymer.

16. A process comprising the steps of charging a vessel with a compound of the structure $$Y(CX_3)_2C\text{—Ar—}C(CX_3)_2Y$$

wherein Ar is selected from the group consisting of unsubstituted aromatic compounds; aromatic compounds substituted with electron donating groups, selected from the group consisting of alkyl and oxyalkyl groups; heterocyclic aromatic compounds; and ferrocene; Y is selected from the group consisting of OH, F, Cl, Br, $CF_3CO_2$—, $CH_3CO_2$—, and

and X is selected from the group consisting of halogens and straight chain perhaloalkyls of from 1 to 3 carbon atoms, wherein at least four of each group of 6 X's are fluorine, a solvent comprising hydrogen fluoride, a catalyst which is a fluoride which is hydrolyzed by water to hydrogen fluoride and an oxide, and a compound selected from the group consisting of aromatic compounds; aromatic compounds substituted with electron donating groups, selected from the group consisting of alkyl and oxyalkyl groups; heterocyclic aromatic compounds; and aromatic organo-metallic compounds; and heating said reaction mixture at from 50 to 200° C. and recovering a condensation polymer.

References Cited by the Examiner

UNITED STATES PATENTS 3,110,687   11/1963   Smith _____ 260—2
3,193,513   6/1965    Cook _____ 260—2

WILLIAM H. SHORT, *Primary Examiner.*

J. C. MARTIN, *Assistant Examiner.*